US010703426B2

(12) United States Patent
Steiner et al.

(10) Patent No.: US 10,703,426 B2
(45) Date of Patent: Jul. 7, 2020

(54) SNOW GROOMING VEHICLE

(71) Applicant: PRINOTH S.p.A., Vipiteno (IT)

(72) Inventors: Günther Steiner, Colle Isarco (IT); Martin Ripfl, Vipiteno (IT)

(73) Assignee: PRINOTH S.P.A., Vipiteno (IT)

( * ) Notice: Subject to any disclaimer, the term of this patent is extended or adjusted under 35 U.S.C. 154(b) by 0 days.

(21) Appl. No.: 15/698,268

(22) Filed: Sep. 7, 2017

(65) Prior Publication Data

US 2018/0072359 A1 Mar. 15, 2018

(30) Foreign Application Priority Data

Sep. 9, 2016 (IT) .................. 102016000091430

(51) Int. Cl.
| | | |
|---|---|---|
| B62D 55/28 | (2006.01) | |
| B62D 55/088 | (2006.01) | |
| B62D 49/06 | (2006.01) | |
| B62D 55/21 | (2006.01) | |
| E01H 4/02 | (2006.01) | |
| E01H 5/09 | (2006.01) | |

(52) U.S. Cl.
CPC ......... *B62D 55/286* (2013.01); *B62D 49/065* (2013.01); *B62D 55/0882* (2013.01); *B62D 55/21* (2013.01); *E01H 4/02* (2013.01); *E01H 5/092* (2013.01); *E01H 5/096* (2013.01)

(58) Field of Classification Search
CPC ............... B62D 55/286; B62D 55/088; B62D 55/0882; B62D 49/065; E01H 5/092; E01H 5/096; E01H 4/02
See application file for complete search history.

(56) References Cited

U.S. PATENT DOCUMENTS

| | | | | |
|---|---|---|---|---|
| 352,483 | A * | 11/1886 | Moore .................. | B60B 15/02 301/43 |
| 607,014 | A * | 7/1898 | Bostwick ............... | A01B 35/14 172/292 |
| 1,688,250 | A * | 10/1928 | Thompson ............... | B60S 1/68 280/855 |
| 2,077,919 | A * | 4/1937 | Engstrom ............... | B60S 1/68 280/856 |
| 2,637,603 | A * | 5/1953 | Cartlidge ............. | B62D 55/0882 180/9.64 |
| 2,982,584 | A * | 5/1961 | Uemura ............... | B62D 55/0882 305/107 |

(Continued)

FOREIGN PATENT DOCUMENTS

| | | | | |
|---|---|---|---|---|
| CA | 2978842 A1 * | 3/2018 | .......... | B62D 49/065 |
| JP | 61016180 A * | 1/1986 | ......... | B62D 55/0882 |

(Continued)

OTHER PUBLICATIONS

Italian Search Report and Written Opinion for Italian Application No. 201600091430 dated Jul. 18, 2017.

*Primary Examiner* — Jamie L McGowan
(74) *Attorney, Agent, or Firm* — Neal, Gerber & Eisenberg LLP

(57) ABSTRACT

A snow grooming vehicle comprising a support frame; an engine; two tracks mounted on opposite sides of the support frame itself, coupled to and driven by the engine; and comprising a first plurality of bristles arranged in a portion of the snow grooming vehicle adjacent to the track so as to capture the snow collected on the track.

27 Claims, 4 Drawing Sheets

(56) References Cited

U.S. PATENT DOCUMENTS

| | | | | |
|---|---|---|---|---|
| 4,134,622 A * | 1/1979 | Krolak | ............... | B62D 55/0882 305/107 |
| 4,198,103 A * | 4/1980 | Ward | ........................ | B60S 1/68 180/9.1 |
| 4,278,391 A * | 7/1981 | Dagenais | ........... | B62D 55/0845 280/762 |
| 4,830,439 A * | 5/1989 | Collins | ................ | B62D 55/088 305/110 |
| 5,566,420 A * | 10/1996 | Specht | ................... | A46B 7/023 15/256.5 |
| 5,725,292 A * | 3/1998 | Keedy | ................ | B62D 55/0882 305/107 |
| 5,857,238 A * | 1/1999 | Jmill | ........................ | A46B 9/00 15/244.1 |
| 5,863,104 A * | 1/1999 | Satzler | ................. | B62D 55/088 305/107 |
| 5,938,301 A * | 8/1999 | Hostetler | ................ | B62D 55/12 305/110 |
| 5,951,124 A * | 9/1999 | Hoffart | ................ | B62D 55/088 305/111 |
| 5,967,630 A * | 10/1999 | Sewell | ................... | A01B 71/08 305/100 |
| 6,000,766 A * | 12/1999 | Takeuchi | ............. | B62D 55/088 305/114 |
| 6,267,458 B1 * | 7/2001 | Hansen | ............. | B62D 55/0845 293/102 |
| 6,334,630 B1 * | 1/2002 | Barros, Sr. | ............. | A01B 71/08 15/256.5 |
| 6,434,781 B1 * | 8/2002 | Guerra | ................... | A63B 57/60 15/256.5 |
| 6,633,150 B1 * | 10/2003 | Wallach | ................... | A47L 9/009 15/21.1 |
| 7,832,814 B2 * | 11/2010 | Breton | ................. | B62D 55/088 305/107 |
| 8,827,382 B1 * | 9/2014 | Jeffs | ........................ | B62D 55/26 305/108 |
| 9,994,198 B1 * | 6/2018 | Emanuelli | ............... | B60S 3/041 |
| 2004/0045582 A1 * | 3/2004 | Wilmo | ................... | E01H 1/042 134/6 |
| 2008/0236992 A1 * | 10/2008 | Illedits | ................... | B66B 29/06 198/325 |
| 2011/0163595 A1 * | 7/2011 | Kirchmair | ............. | B62D 55/21 305/46 |
| 2013/0181508 A1 * | 7/2013 | Zakuskin | ............... | B62D 55/04 305/154 |
| 2016/0214578 A1 * | 7/2016 | Sanders | ................... | B60S 1/68 |
| 2017/0129554 A1 * | 5/2017 | Conover | ............ | B62D 55/0882 |
| 2018/0037279 A1 * | 2/2018 | Carpenter | .......... | B62D 55/0882 |

FOREIGN PATENT DOCUMENTS

| | | |
|---|---|---|
| JP | S61 16180 A | 1/1986 |
| JP | 2008 094199 A | 4/2008 |
| WO | WO 2009/144291 | 12/2009 |
| WO | WO-2015046533 A1 * | 4/2015 ........... B62D 55/088 |

* cited by examiner

SNOW GROOMING VEHICLE

PRIORITY CLAIM

This application claims the benefit of and priority to Italian Patent Application No. 102016000091430, filed on Sep. 9, 2016, the entire contents of which are incorporated by reference herein.

TECHNICAL FIELD

The present disclosure relates to a snow grooming vehicle.

In particular, the present disclosure relates to a snow grooming vehicle comprising a support frame; an engine; and two track conveyors mounted on opposite sides of said support frame and coupled to and driven by the engine.

BACKGROUND

Each track conveyor comprises a set of rotating wheels coupled to the support frame, and a track looped around said wheels.

The snow grooming vehicle is normally equipped with a plurality of operating units, such as a tiller for processing the snow of the ski slopes, a shovel for moving snow masses along the ski slopes, and/or a winch assembly.

The snow grooming vehicle comprises snow guard elements housed in a rear portion of the snow grooming vehicle and around portions of the respective tracks. In particular, each snow guard element is arranged around a rear portion of the respective track so as to cover the rear of the track to reduce the amount of snow projected from the track towards the outside. In particular, the snow guard element, just like the wings in common vehicles, has the shape of a bird's wing.

The snow guard element is usually made of hard plastic or metal.

However, the snow guard element is not always able to capture an adequate amount of snow and, consequently, in many cases, a certain quantity of snow is projected from the track towards the outside. This drawback is very important when the snow grooming vehicle is equipped with a snow tiller positioned at the rear of the snow grooming vehicle. In these cases, the snow from the track is projected onto, and accumulates on, the tiller, thereby increasing its overall weight, the consumption of the tracked vehicle and the manoeuvrability of said tiller and of the snow grooming vehicle.

In addition, each track comprises several belts and grousers fixed to the belts. Another drawback of the snow grooming vehicle of certain prior snow grooming vehicles is that some snow accumulates between the grousers and, consequently, both the grip of the track in the snow and the performance of the snow grooming vehicle decrease because of the greater weight of the track due to the accumulated snow.

SUMMARY

One advantage of the present disclosure is to provide a snow grooming vehicle that reduces certain of the drawbacks set forth above.

According to the present disclosure, a snow grooming vehicle is provided, which comprises a support frame; an engine; two tracks mounted on opposite sides of the support frame itself, coupled to and driven by the engine; and a first plurality of bristles arranged in a portion of the snow grooming vehicle adjacent to the track so as to intercept the snow from the track.

By virtue of the present disclosure, the first plurality of bristles of the snow grooming vehicle captures part of the snow present on or coming from the track, thus managing to reduce the weight of the track and/or the amount of snow projected from the track outwards, for example onto a tiller connected to the snow grooming vehicle.

According to certain embodiments of the present disclosure, the first plurality of bristles are housed around a first portion of the track at the rear end of the track, and extend along a first axis; the first axis forms a first angle with a reference axis parallel to the ground and extending along the snow grooming vehicle; the first angle being comprised between 0° and 90°.

According to certain embodiments of the present disclosure, the snow grooming vehicle comprises a snow tiller; the first plurality of bristles are interposed between the respective track and the snow tiller.

According to other embodiments of the present disclosure, the first plurality of bristles are housed around a first portion of the track at the rear end of the track, and extend along a second axis which forms a second angle with a reference axis parallel to the ground and extending along the snow grooming vehicle; the second angle being comprised between 90° and 180°.

According to another embodiment of the present disclosure, the first plurality of bristles are in contact with a portion of the track.

According to another embodiment of the present disclosure, a lower end of the first plurality of bristles are in contact with a grouser of the track in an operative configuration and overlap the grouser for a length comprised between 0 mm and the total length of the grouser.

According to another embodiment of the present disclosure, the first plurality of bristles are not in contact with the grouser and a lower end of the first plurality of bristles have a distance from the grouser comprised between 0 and 20 mm.

According to certain embodiments of the present disclosure, the first plurality of bristles are in contact with a belt of the track.

According to a further embodiment of the present disclosure, the first plurality of bristles are housed around a first portion of the track at a rear end of the track, and extend parallel to the extension direction of one of the grousers of the track.

According to another embodiment of the present disclosure, the snow grooming vehicle comprises a snow guard comprising at least one of the materials selected from the group consisting of plastic, metal, glass-fibre and fibre; the snow guard being arranged in a rear position of the snow grooming vehicle and so as to surround the first portion of the track; the first plurality of bristles being connected to the snow guard.

According to another embodiment of the present disclosure, the snow guard has the shape of a bird's wing.

According to another embodiment of the present disclosure, the snow grooming vehicle comprises a second plurality of bristles, wherein the first plurality of bristles are housed around a first portion of the track at a rear end of the track, and extend along a first axis, the first axis forms a first angle with a reference axis parallel to the ground and extending along the snow grooming vehicle; and the second plurality of bristles are housed around a first portion of the track at a rear end of the track, and extend along a second axis which forms a second angle with a reference axis parallel to the ground and extending along the snow grooming vehicle; the second angle is comprised between 90° and 180°.

According to another embodiment of the present disclosure, the snow grooming vehicle comprises a third plurality of bristles arranged parallel to the surface of the track, and in particular extending parallel to the extension direction of one of the grousers of the track.

In particular, the first plurality of bristles and/or the second plurality of bristles and/or the third plurality of bristles, respectively, are organized into brush-like structures.

Additional features and advantages are described in, and will be apparent from, the following Detailed Description and the figures.

BRIEF DESCRIPTION OF THE DRAWINGS

The present disclosure will now be described with reference to the accompanying drawings, which illustrate a non-limiting embodiment thereof, in which.

DETAILED DESCRIPTION OF THE DISCLOSURE

Figure 1:
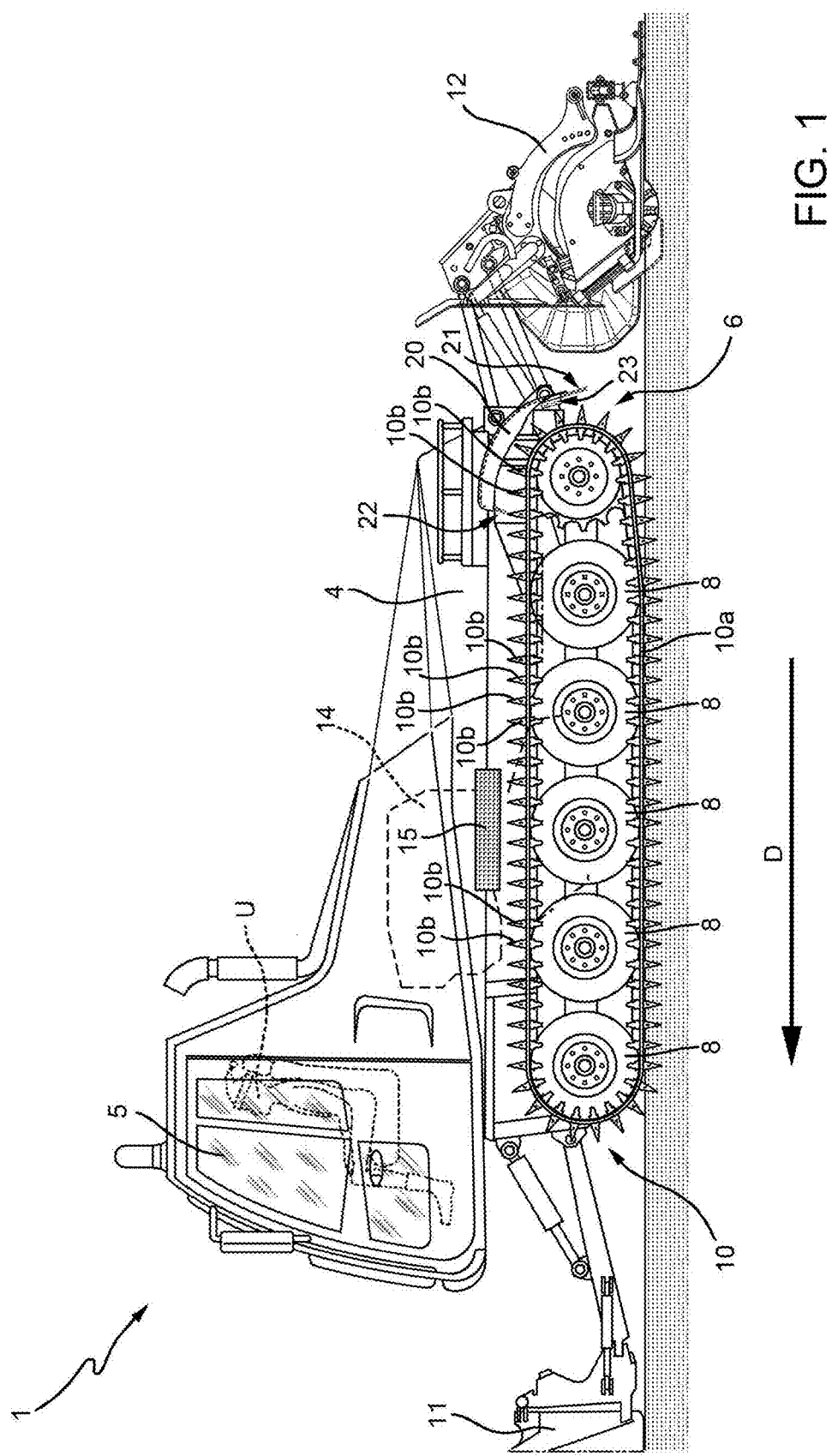
FIG. 1 is a side view, with parts removed for clarity, of the snow grooming vehicle of the present disclosure.

Referring now to the example embodiments of the present disclosure illustrated in FIGS. 1 to 4, with reference to FIG. 1, reference numeral 1 indicates, as a whole, a snow grooming vehicle for the preparation of ski slopes.

The snow grooming vehicle 1 is motorized to move along a snow-covered path in a forward direction D, and comprises a support frame 4, a driver's cabin 5 mounted on the frame 4, and two track conveyors 6 (only one of which is shown in FIG. 1) mounted on opposite sides of the frame 4. Moreover, the two track conveyors 6 extend along direction D.

Each track conveyor 6 comprises a set of wheels 8 mounted on the frame 4 so as to rotate about respective rotation axes transversal to direction D, and a track 10 looped around the front wheel 8 and the rear wheel 8, and has a lower arm, which is kept in contact with the slope by the intermediate wheels 8. The track 10 comprises a plurality of looped belts 10a and a plurality of grousers 10b transverse to direction D and fixed, spaced from each other, to the belts along direction D. The belts 10a of each track 10 are spaced from each other along an axis perpendicular to direction D.

The snow grooming vehicle 1 is also provided with a shovel 11 connected to the front of the frame 4 to move snow masses along the slope, and a tiller 12 connected to the rear of the frame 4 and configured to process the snow of the snow-covered path.

The snow grooming vehicle 1 also comprises an engine 14, particularly an internal combustion engine, connected with at least one of the front and rear wheels, the shovel 11 and the tiller 12 by a transmission member of a known type (not shown in the attached figures). Accordingly, the tracks 6 are driven by the engine 14. In addition, the snow grooming vehicle 1 comprises a radiator 15 located on the frame 4 above the track 10.

The driver's cabin 5 comprises controls 13 configured to drive the movement of the snow grooming vehicle 1 and configured to control the operating units of the snow grooming vehicle 1, such as the shovel 11 and the tiller 12. The driver's cabin 5 comprises a seat for a driver U of the snow grooming vehicle 1 and may comprise one or two seats for passengers.

The snow grooming vehicle 1 comprises two snow guards 20 having a curved shape, in particular the shape of a bird's wing. Each snow guard 20 is made of one or more of the following materials: plastic, metal, fibre, glass-fibre. Each snow guard 20 is arranged in a rear position of the snow grooming vehicle 1 and so as to surround a portion of the track 10, in particular a rear portion of the track 10. In greater detail, the snow guard 20 is arranged so as to wrap the portion of the track 10 at the top and/or back thereof.

Each snow guard 20 is coupled to the frame 4 in a rear position of the frame 4.

The snow grooming vehicle 1 comprises, for each track 10, a plurality of bristles 21, a plurality of bristles 22 and a plurality of bristles 23. Each of the plurality of bristles is organized into respective brush-like structures.

The plurality of bristles 21 are connected to the snow guard 20 and arranged in a rear portion of the snow grooming vehicle 1 adjacent to the respective track 10 so as to intercept the snow on the track 10 and projected from the track 10 during the movement of the track 10.

Figure 2:
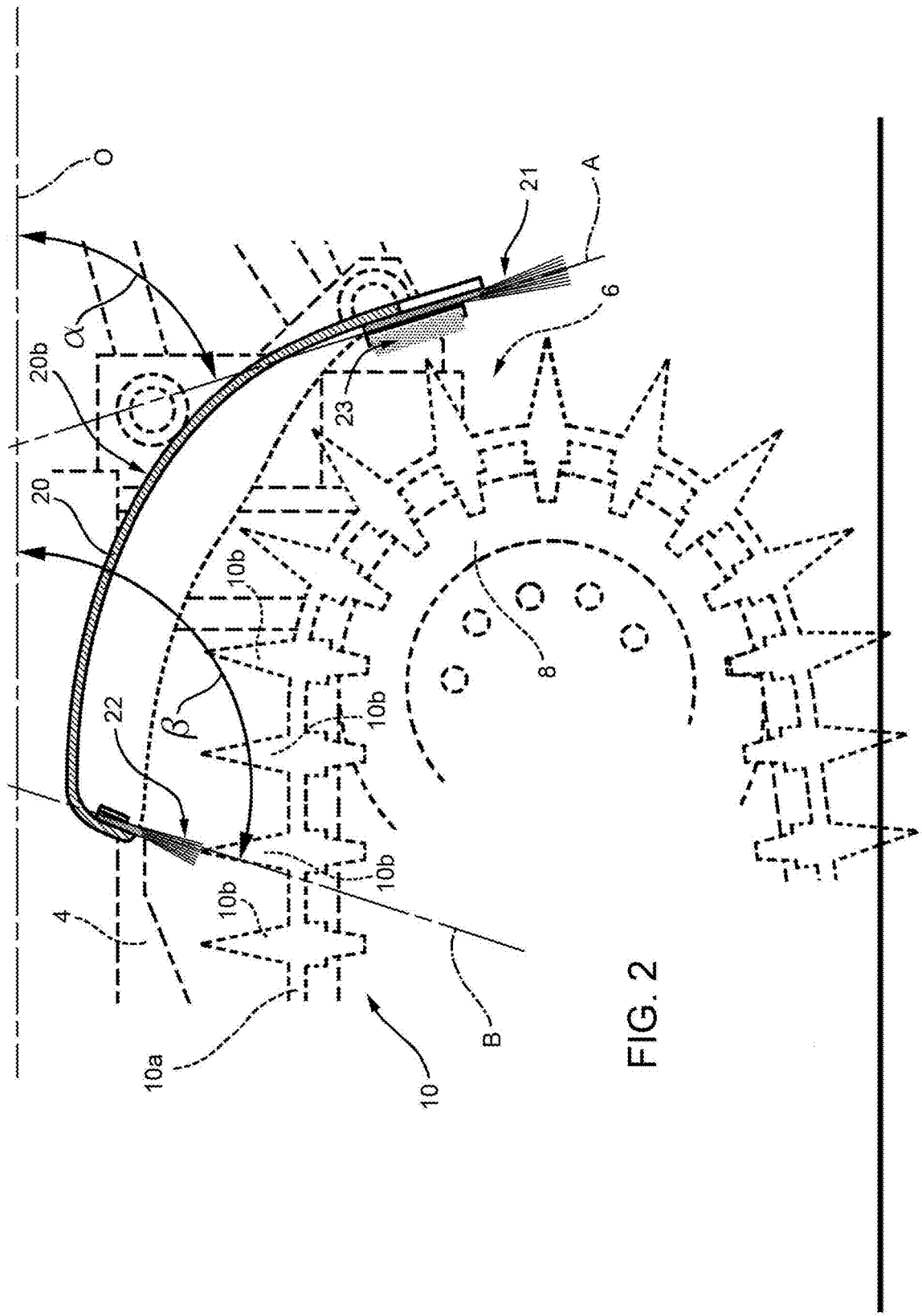
FIG. 2 is an enlarged view of a detail of FIG. 1.
Figure 3:
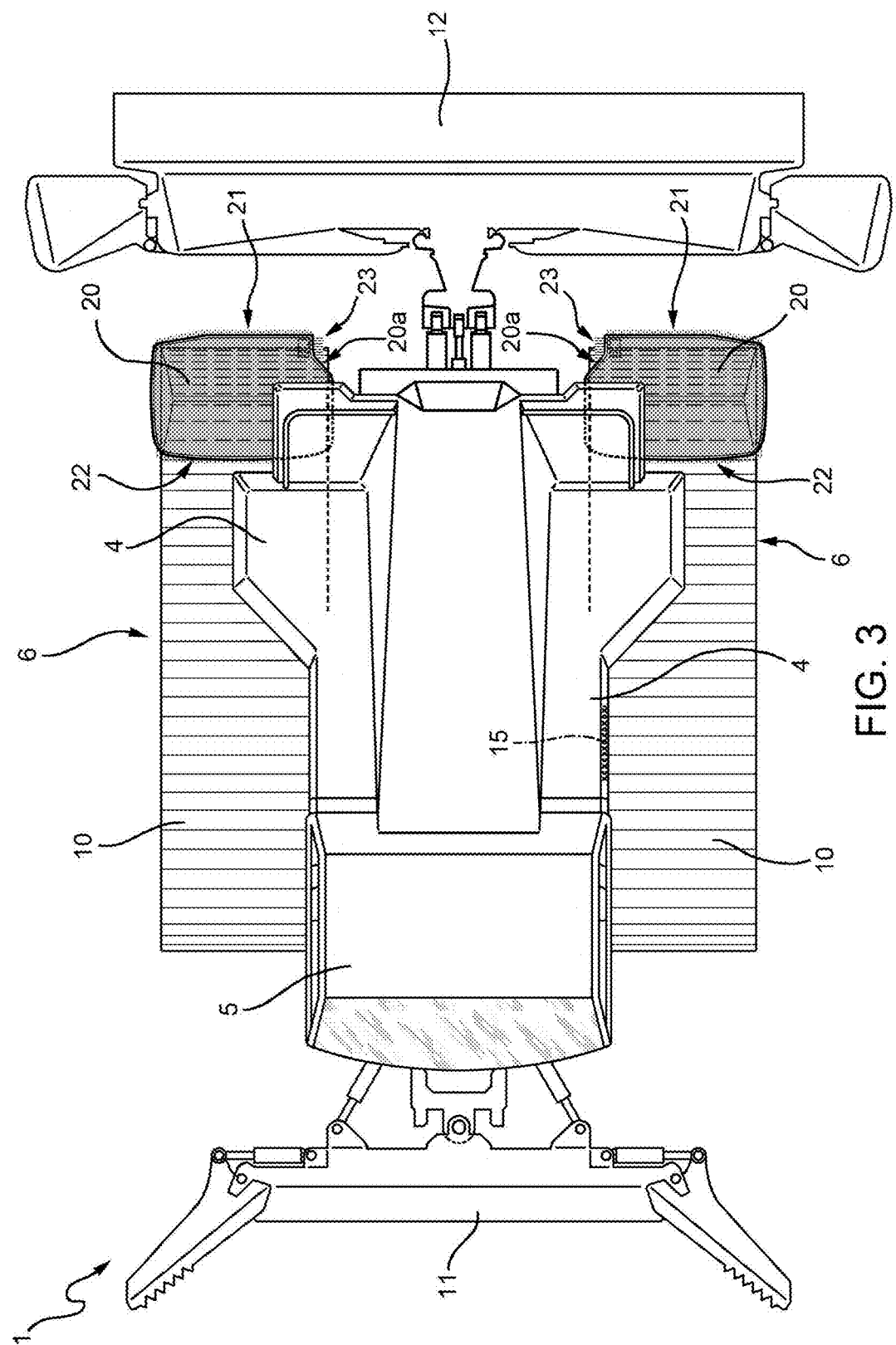
FIG. 3 is a top view of the snow grooming vehicle of the present disclosure.
Figure 4:
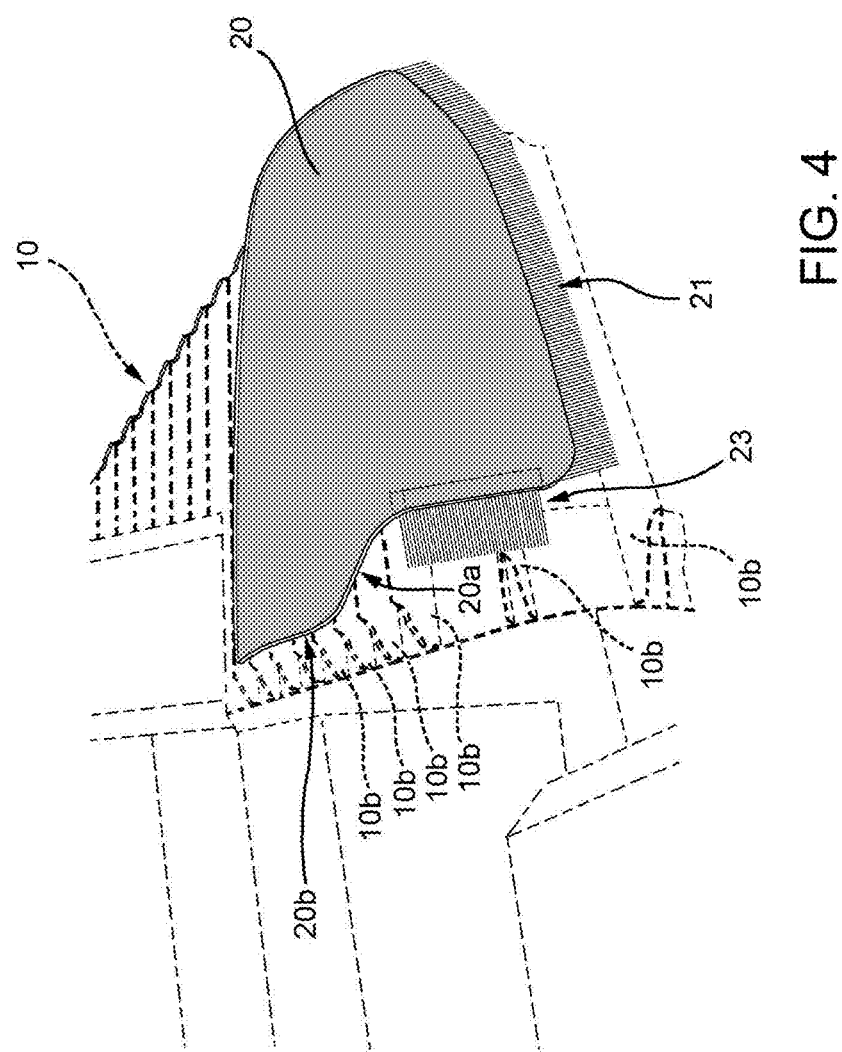
FIG. 4 is an enlarged perspective view of a detail of the snow grooming vehicle of the present disclosure.

With reference to FIG. 2, the plurality of bristles 21 are housed around a portion of the track 10 at a rear end of the track 10, and extend along an axis A. The axis A forms an angle $\alpha$ with a reference axis O. The reference axis O is parallel to the ground and extends along the snow grooming vehicle 1. The angle $\alpha$ is comprised between 0° and 90°.

The plurality of bristles 21 are interposed between the respective track 10 and the snow tiller 12.

The plurality of bristles 21 extend from the snow guard 20 towards the snow, and in particular the plurality of bristles 21 on one side extend along a direction incident to the snow.

The plurality of bristles 22 are connected to the snow guard 20 and are housed around the rear portion of the track 10.

The plurality of bristles 22 extends along an axis B that forms an angle $\beta$ with the reference axis O. The angle $\beta$ is comprised between 90° and 180°.

The plurality of bristles 22 extend from the snow guard 20 to the track 10, and, in an operative configuration, a lower end of the plurality of bristles 22 are in contact with the grouser 10b of the track 10 and overlap the grouser 10b for a length comprised between 0 mm and the total length of the grouser. Accordingly, in use, the plurality of bristles 22 are then in contact with the grousers 10b of the track 10 to sweep the snow away from the grousers 10b and the snow deposited between successive grousers 10b.

In a further embodiment of the present disclosure, the plurality of bristles 22 are in contact with a belt 10a of the track 10 and with the grouser 10b. In use, the plurality of bristles 22 remove a large amount of snow that accumulates between successive grousers 10b and on the belt 10a of the track 10.

According to another embodiment of the present disclosure, the plurality of bristles 22 are not in contact with the grouser 10b, and the lower end of the plurality of bristles 22 have a distance from the grouser comprised between 0 and 20 mm. In use, the plurality of bristles 22 sweeps away the snow that accumulates around the grousers 10b.

The plurality of bristles 22, by sweeping the snow away from the track 10, make the track 10 itself lighter, and consequently reduces consumption.

The plurality of bristles 23 are housed around a portion of the track 10 at a rear end of the track 10, and extends parallel to the extension direction of one of the grousers 11 of the track 10. In particular, the plurality of bristles 23 are fixed to the snow guard 20 along a side surface 20b of the snow guard 20 facing a main body of the snow grooming vehicle 1, or to the frame 4 of the snow grooming vehicle 1. In particular, the snow guard 20 has a recess 20a along the side surface 20b facing the main body of the snow grooming vehicle 1. The plurality of bristles 23 are arranged along the recess 20a of the snow guard 20.

Each bristle has a diameter of between 1 and 2.5 mm, such as 1.5 mm; and comprises at least one of the following types of materials: animal, plant, synthetic. In addition, each bristle is flexible.

By virtue of the present disclosure, the plurality of bristles 21 and 23 capture the snow projected from the track 10 towards the rear of the tracked vehicle 1, in particular above the tiller 12, and therefore prevent accumulation of snow on the tiller 12.

The plurality of bristles 22, instead, reduce the snow between successive grousers 10b of the track 10 and consequently make the track 10 lighter, thereby reducing the consumption of the snow grooming vehicle 1. Moreover, the plurality of bristles 22, by sweeping the snow away from the track 10, reduce the possibility of snow interfering with the radiator 15 of the snow grooming vehicle 1.

Clearly, changes may be made to the bogie and system as described and claimed, without, however, departing from the scope of the accompanying Claims and without diminishing its intended advantages. It is therefore intended that such changes and modifications be covered by the appended claims.

The invention is claimed as follows:

1. A snow grooming vehicle comprising:
    a support frame;
    an engine;
    a track mounted on one side of the support frame, said track coupled to and driven by the engine;
    a snow guard coupled to the support frame and arranged in a rear position of the snow grooming vehicle to surround a rear portion of the track by wrapping around at least one of a top of the rear portion of the track and a back of the rear portion of the track,
    a first plurality of bristles at a rear end of the track extending along a first axis, the first axis forming a first angle with a reference axis, the first angle being between 0° and 90°, and the reference axis being parallel to the ground and extending along the snow grooming vehicle, each bristle being a flexible bristle comprising a first end connected to and extending from the snow guard and a second end spaced apart from the snow guard, the first plurality of bristles arranged adjacent to the track, wherein when the track is moving, for at least one of the plurality of bristles, the first end of that bristle remains stationary relative to any movement of the snow grooming vehicle and the second end of that bristle intercepts snow collected on the track, and
    a snow tiller coupled to a rear of the support frame, wherein the first plurality of bristles are interposed between the track and the snow tiller and the first angle faces the snow tiller such that for a bristle of the first plurality of bristles, the first end of that bristle is a first distance away from the rear end of the track and the second end of that bristle is a second, greater distance away from the rear end of the track.

2. The snow grooming vehicle of claim 1, further comprising a second plurality of bristles connected to and extending from the snow guard, the second plurality of bristles extending along a second axis which forms a second angle with the reference axis, the second angle being between 90° and 180°.

3. The snow grooming vehicle of claim 2, wherein the second plurality of bristles are organized into a structure of a brush.

4. The snow grooming vehicle of claim 1, wherein the first plurality of bristles are in contact with a portion of the track.

5. The snow grooming vehicle of claim 1, wherein when the track is moving, the second end of at least one bristle of the first plurality of bristles is selectively in contact with a grouser of the track to overlap the grouser for a length of between zero mm and a total length of the grouser.

6. The snow grooming vehicle of claim 1, wherein the first plurality of bristles are not in contact with a grouser of the track and the second end of at least one bristle of the first plurality of bristles has a distance from the grouser of between zero millimeters and twenty millimeters.

7. The snow grooming vehicle of claim 1, wherein the second end of at least one bristle of the first plurality of bristles is in contact with a belt of the track.

8. The snow grooming vehicle of claim 1, wherein the first plurality of bristles at the rear end of the track extend parallel to an extension direction of a grouser of the track.

9. The snow grooming vehicle of claim 1, wherein the snow guard is formed from at least one material selected from the group consisting of: a plastic, a metal, a glass-fiber and a fiber.

10. The snow grooming vehicle of claim 1, wherein the snow guard has a curved shape.

11. The snow grooming vehicle of claim 1, further comprising a second plurality of bristles connected to and extending from the snow guard and arranged parallel to a surface of the track.

12. The snow grooming vehicle of claim 11, wherein the second plurality of bristles extend parallel to an extension direction of a grouser of the track.

13. The snow grooming vehicle of claim 11, wherein the second plurality of bristles are organized into a structure of a brush.

14. The snow grooming vehicle of claim 1, wherein the first plurality of bristles are organized into a structure of a brush.

15. A snow grooming vehicle comprising:
    a support frame;
    an engine;
    a track mounted on one side of the support frame, said track coupled to and driven by the engine;
    a snow guard coupled to the support frame and arranged in a rear position of the snow grooming vehicle to surround a rear portion of the track by wrapping around at least one of a top of the rear portion of the track and a back of the rear portion of the track, and
    a first plurality of bristles connected to and extending from the snow guard along a first axis, each bristle being a flexible bristle located above the track between a rear end of the track and a front end of the track and comprising a first end connected to and extending from the snow guard and a second end spaced apart from the snow guard, the first plurality of bristles arranged adjacent to the track, wherein when the track is moving, for at least one of the plurality of bristles, the first end of that bristle remains stationary relative to any movement of the snow grooming vehicle and the second end of that bristle intercepts snow collected on the track and a first angle, calculated clockwise from a reference axis to the first axis and being between 90° and 180°, is formed between the reference axis, parallel to the ground and extending along the snow grooming vehicle, and the first axis.

16. The snow grooming vehicle of claim 15, further comprising a second plurality of bristles at the rear end of the track extending along a second axis, the second axis forming a second angle with the reference axis and the second angle facing a snow tiller attached to the rear end of the snow grooming vehicle such that for a bristle of the second plurality of bristles, a first end of that bristle is a first distance away from the rear end of the track and a second end of that bristle is a second, greater distance away from the rear end of the track, the second angle being between 0° and 90°.

17. The snow grooming vehicle of claim 15, further comprising a snow tiller, wherein a second plurality of bristles are interposed between the track and the snow tiller.

18. The snow grooming vehicle of claim 15, wherein at least one of the first plurality of bristles is organized into a structure of a brush.

19. The snow grooming vehicle of claim 15, wherein the first plurality of bristles are in contact with a portion of the track.

20. The snow grooming vehicle of claim 15, wherein when the track is moving, the second end of at least one bristle of the first plurality of bristles is selectively in contact with a grouser of the track to overlap the grouser for a length of between zero millimeters and a total length of the grouser.

21. The snow grooming vehicle of claim 15, wherein the first plurality of bristles are not in contact with a grouser of the track and the second end of at least one bristle of the first plurality of bristles has a distance from the grouser of between zero millimeters and twenty millimeters.

22. The snow grooming vehicle of claim 15, wherein the second end of at least one bristle of the first plurality of bristles is in contact with a belt of the track.

23. The snow grooming vehicle of claim 15, wherein the first plurality of bristles extend parallel to an extension direction of a grouser of the track.

24. The snow grooming vehicle of claim 15, wherein the snow guard is formed from at least one material selected from the group consisting of: a plastic, a metal, a glass-fiber and a fiber.

25. The snow grooming vehicle of claim 15, wherein the snow guard has a curved shape.

26. The snow grooming vehicle of claim 15, further comprising a second plurality of bristles connected to and extending from the snow guard and arranged parallel to a surface of the track.

27. The snow grooming vehicle of claim 15, wherein a second plurality of bristles are connected to and extend from the snow guard and arranged in another portion of the snow grooming vehicle at the rear end of the track.

* * * * *